April 10, 1962  A. LYKKEBERG  3,028,894
MEAT SLICING MACHINE
Filed Oct. 29, 1958  3 Sheets-Sheet 1

INVENTOR.
ALFRED LYKKEBERG
BY
ATTORNEY

April 10, 1962

A. LYKKEBERG 3,028,894

MEAT SLICING MACHINE

Filed Oct. 29, 1958

INVENTOR.
ALFRED LYKKEBERG
BY

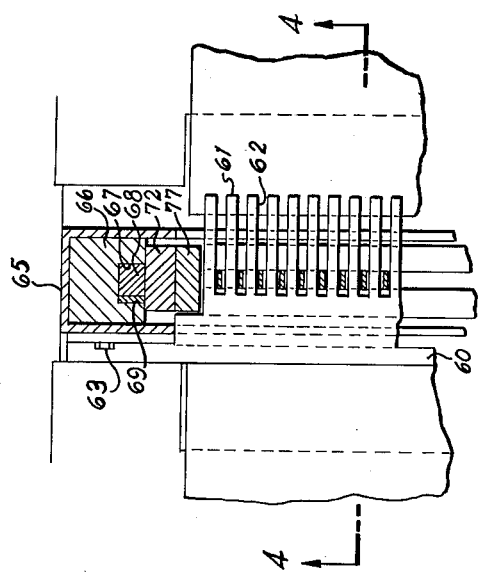

United States Patent Office 3,028,894
Patented Apr. 10, 1962

3,028,894
MEAT SLICING MACHINE
Alfred Lykkeberg, 2507 22nd Ave., San Francisco, Calif.
Filed Oct. 29, 1958, Ser. No. 770,479
2 Claims. (Cl. 146—153)

This invention relates to a meat slicing machine. More particularly this invention relates to a machine for automatically slicing bulk meat, such as large roasts and steak cuts, large hams, etc. into slices of any desired thickness.

Heretofore the slicing of meat in large retail butcher and consumer establishments, such as the meat departments of supermarkets and the kitchens of large institutions, has been time consuming and expensive because of the excessive hand labor required. For example, it is often necessary to slice bulk meat long prior to the time of sale. This practice has the disadvantage that juices drain from the sliced meat and are lost. This results in a loss of weight and of juices which have food and flavor value.

Another problem in connection with the slicing of bulk meat is the problem of adjustment whereby slicing may be done at one thickness (e.g., ½"), then at another thickness (e.g., ¾"). It is desirable that meat slicing be done on a multiple or gang basis (i.e., many slices at once), and that the slicing be adjustable so that, after a certain number of slices have been produced of one thickness, the machine can be easily and speedily altered to effect slicing at another thickness. Heretofore, to my knowledge, no machine has been provided which permits gang slicing, which permits adjustment of slice thickness and wherein the adjustment can be carried out quickly and easily.

It is an object of the present invention to provide an improved meat slicing machine.

It is a further object of the invention to provide an automatic meat slicer capable of cutting large pieces of meat into multiple slices of any desired thickness, such being done automatically and at high speed.

Yet another object of the invention is to provide an automatic meat slicer in which the blades or cutting elements can be varied rapidly and easily to enable an operator to adjust the machine to cut slices of different thickness.

Yet another object is to provide an automatic gang meat slicer wherein a set of slicing blades can be removed quickly and another set inserted quickly to vary the thickness of slicing.

The above and other objects will be apparent from the ensuing description and the appended claims.

One form of the invention is illustrated by way of example in the accompanying drawings in which:

FIGURE 3 is an enlarged fragmentary, horizontal sectional view taken along the line 3—3 of FIGURE 1 showing the slide frame mounting and the comb or blade separator.

FIGURE 4 is a fragmentary, vertical sectional view as seen along the line 4—4 of FIGURE 3.

FIGURE 5 is an enlarged fragmentary, vertical sectional view taken along the line 5—5 of FIGURE 1.

FIGURE 6 is a top view as seen along the line 6—6 of FIGURE 5.

FIGURE 7 is an enlarged fragmentary sectional view taken along the line 7—7 of FIGURE 2.

Figure 1:
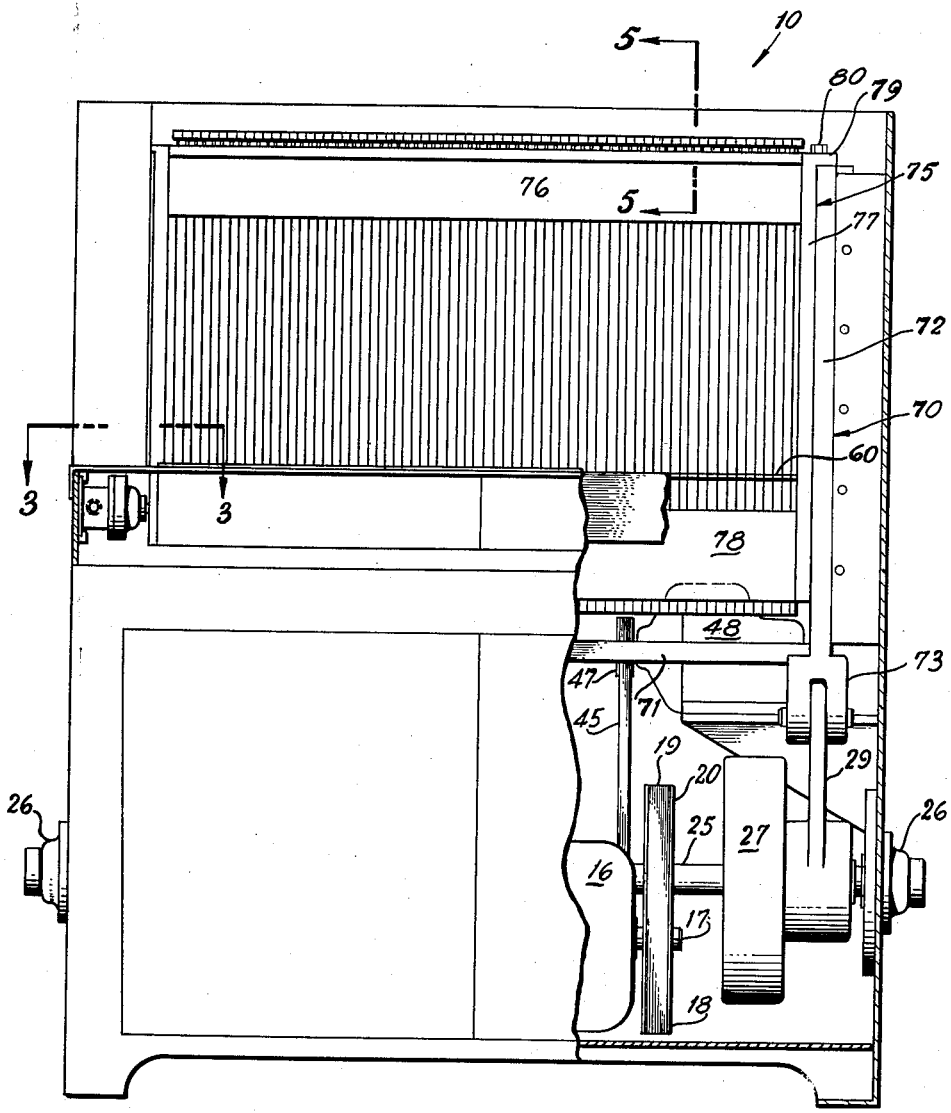
FIGURE 1 is a view in end elevation of the meat slicing machine of the present invention with parts broken away to reveal some of the interior mechanism.
Figure 2:
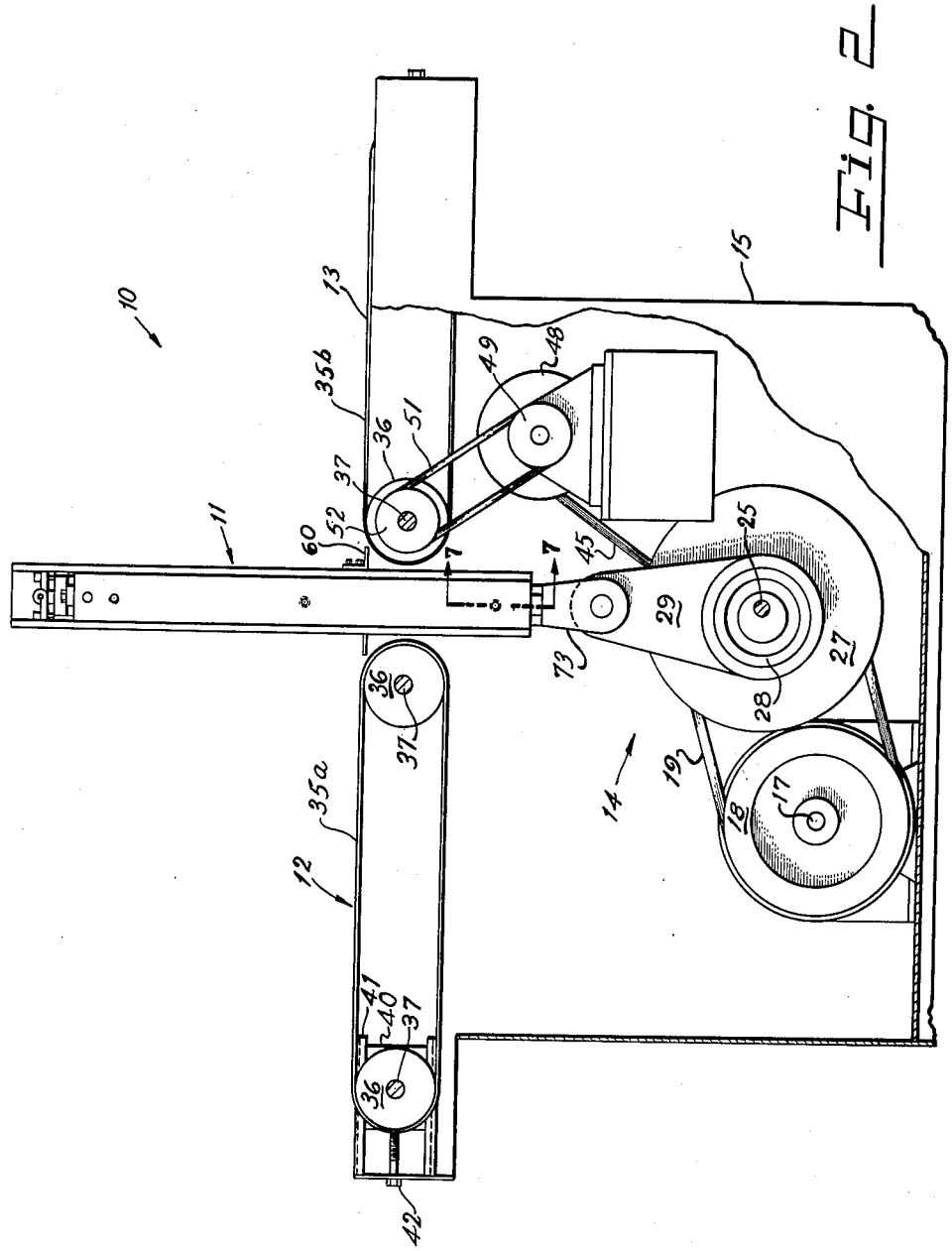
FIGURE 2 is a view in side elevation as seen from the right of FIGURE 1 but with most of the housing broken away to reveal the interior portions of the machine.

Referring now to the drawings and primarily to FIGURES 1 and 2, the machine of the present invention is generally designated by the reference numeral 10. It comprises a cutting assembly 11, an intake roller and belt assembly 12, an exit roller and belt assembly 13, a power and transmission assembly 14 and a housing 15. Power for the machine is provided by an electric motor 16 having a shaft 17 to which is fixed a pulley 18. The pulley 18 is connected by a belt 19 to another pulley 20 which is fixed to a countershaft 25 which is journaled in bearings 26. A fly wheel 27 is fixed to the shaft 25. Two eccentrics 28 (only one of which is shown) are rotated by the countershaft 25 and their connecting rods 29 are fixed to the lower end of a slide frame 70 which is described hereinafter.

As best shown in FIGURE 2, the left-hand or intake belt and roller assembly 12 comprises a belt 35a which is mounted on rollers 36 which are carried by shafts 37. One of the shafts 37 is journaled in bearing blocks 40 which are slidable in gibs 41. Adjustment is made, and the bearing blocks are held in adjusted position, by means of screws 42, one of which is shown. By this means the belt 35a can be tightened or slackened as desired. The belt 35b of the right-hand or exit belt and roller assembly 13 is similar, being mounted on a pair of rollers, one of which is shown at 36 and which are carried by shafts 37, one of which is shown.

Referring now to FIGURES 1 and 2, a belt 45 is driven by a pulley (not shown) on the countershaft 25 and it drives a pulley 47 which in turn drives a speed reducer 48 whose output pulley 49 is connected by a belt 51 to a pulley 52 which is fixed to the shaft 37 of one of the rollers 36. A chain and sprocket connection (not shown) is provided between the shafts 37 on opposite sides of the cutting assembly 11, whereby the two belts 35a and 35b are driven at the same speed and in the same direction i.e., from left to right as viewed in FIGURE 2.

Referring now to FIGURES 1 and 3, a comb or blade spacer 60 is provided which is cut away at its ends to clear the cutting assembly 11, which is supported and suitably fixed to the framework and which is formed with teeth or fingers 61 which are spaced apart to form uniformly spaced slots 62. The blade spacer 60 is intended to bridge the gap between the belts 35a and 35b on opposite sides of the cutting assembly 11; the slots 62 are intended to permit passage of the blade or cutting elements; and the fingers 61 are intended to prevent warped or bent blades from coming into contact with one another. The spacer 60 is secured to the frame by screws 63.

Referring now to FIGURES 1 and 3, the cutting assembly 11 comprises a channel shaped member 65 on each side of the machine which is bolted, welded or otherwise suitably secured to the housing 15 and within which is secured a bronze way 66 formed with a groove or channel 67 to slidably receive a slide member 68. A gib or bushing is provided at 69 to take up slack and form a snug, sliding fit with the slide member 68. The slide member 68 is fixed to a slide frame 70 having a cross member 71 and two side members 72, only one of which is shown, the other one being identical but reversed. The side members 72 of the slide frame 70 are connected by clevises 73 to the eccentrics 28. It will be apparent that, as the motor 16 operates, the slide frame 70 will be caused to reciprocate vertically, the extent of its travel being determined by the throw of the eccentrics 28. The frame is held firmly but slidably in the ways 66.

Still referring to FIGURES 1 and 3, a demountable inner frame 75 is provided which is formed of a top horizontal member 76, two vertical side members 77 and a bottom cross member 78. As will be seen the upper end of each side member 77 of the demountable frame 75 is formed with an outwardly projecting ear 79 which is formed with a hole (not shown), to mate with a similar hole in the respective side member 72 of slide frame 70, and to receive a screw 80 by means of which the upper end of the demountable frame 75 is clamped in the slide frame 70. Referring to FIGURE 7, the lower end of each of the side members 77 is formed with a notch 81 which engages a pin 81a which is fixed to and projects from the adjacent member 72. By this means it will be apparent that the demountable frame 75 can be very readily detached by removing the screws 80 and lifting it out, and that the same frame or another similar frame can be inserted and clamped in place. Such operations are very easily and quickly accomplished.

The cutting or slicing elements are blades 85 one of which is shown in FIGURES 4 and 5. These are shown as sawtooth blades, but smooth blades may be used. As will be seen in FIGURE 4, at the lower end of each blade 85 there is provided a keeper lug 86 which is pivotally connected to the blade at 87. It will be apparent that, if suitable tension is applied to the upper end of each blade 85, the lug 86 will occupy the position shown in FIGURE 4 and will hold the blade firmly in place. The bottom cross member 78 of the demountable frame 75 is formed with slots 89, one of which is shown in FIGURE 4 to receive the blades 85.

Referring now to FIGURES 5 and 6, the upper cross member 76 of the demountable frame 75 is formed with slots 90, one of which is shown in FIGURE 5, for reception of the blades 85. The upper cross member 76 is also formed with laterally extending flanges 95 which are formed with threaded holes 96 to receive screws 97 which pass through holes 98 formed in tensioning levers 99. Each of the levers 99 is formed with a fulcrum or pivot 100 which is seated in a notch 101 formed in the upper surface of the cross member 76, and each lever member 99 is also formed with a bifurcated end portion 102 which fits on opposite sides of the respective saw blade 89. This bifurcated portion is formed with aligned notches 103 to seat the ends of a pin 104 which is fixed to and extends through the upper end of each of the blades 85. It will be apparent that, by tightening the screws 97 more tension can be applied to the blades 85, and by loosening the screws 97 the blades can be slackened. It will also be apparent that each individual blade is readily removable by loosening its tension screw 97 sufficiently to release it, and then pulling the blade out from the bottom by means of the keeper member 86 (see FIGURE 4).

It will, therefore, be apparent that a very efficient meat cutter is provided. For example, a set of demountable frames 75 may be kept in stock, each having blades 85 located a given distance apart. For example, one frame may have blades spaced ½" apart, another ¾" apart, etc. If it is desired to cut meat into ½" slices, then a frame 75 will be inserted whose blades are set at this distance apart. When it is desired to cut meat into ¾" slices, another frame will be inserted with blades at a ¾" spacing.

If the size of the establishment does not justify keeping an assortment of demountable frames 75 to accommodate all desired slicing operations, then it is a simple matter (although somewhat more time consuming than exchanging frames), to add or remove blades as desired. As noted, it is an easy matter to remove blades and it is an equally easy matter to insert them. Accordingly, if a single frame is equipped with blades half an inch apart and it is then desired to alter the slicing operation to cut one inch slices, every other blade will be removed. Moreover, it is possible to set the blades 85 in a frame 75 so that slices of different thickness will be cut simultaneously.

It is, therefore, apparent that a very efficient meat slicing machine has been provided which is characterized by high speed, automatic operation; by easy adjustability; and by great flexibility.

I claim:

1. An automatic gang slicing machine for slicing raw bulk meat into slices comprising a stationary main frame including two parallel spaced vertically disposed sides having slide channels facing one another; a slide frame vertically slidable in said main frame, said slide frame including a pair of side members and a bottom cross member for connecting said side members, the outer sides of said side members having slide members extending substantially along the length thereof for engaging said slide channels; means disposed within said framework for reciprocating said slide frame in said main frame; a demountable frame dimensioned for accommodation within said slide frame having a top and bottom cross member, said cross members being provided with vertically aligned substantially centrally positioned closed slots; means for securing said demountable frame within said slide frame against motion relative to said slide frame; a plurality of slicing blades, opposite end portions of each blade being received by a vertically aligned pair of slots; and clamping means for detachably clamping the received end portions of each of said blades against the outside surface of said cross members, said claming means including tensioning means for adjusting the tension of said blades.

2. An automatic meat slicing machine for slicing bulk meat into slices of uniform thickness, said slicing machine comprising a stationary framework; a slide frame vertically slidable in said framework; a demountable frame dimensioned for accommodation within said slide frame; a plurality of slicing knives carried by said demountable frame in parallel forming a uniformly spaced array; an intake conveyor and a separate exit conveyor; said intake conveyor being in the form of an endless member having one end closely adjacent said slide frame on one side thereof for supporting bulk meat and to move bulk meat toward said slide frame, said exit conveyor being also in the form of an endless member, being in substantially the same plane as said intake conveyor and having one end closely adjacent said slide frame on the opposite side thereof for supporting slices of meat as they come through said slide frame and to carry these slices of meat away from said frame; and means for simultaneously reciprocating said slide frame, operating said intake conveyor to feed bulk meat to said slide frame and operating said exit conveyor to carry sliced meat away from said slide frame.

References Cited in the file of this patent

UNITED STATES PATENTS

| | | |
|---|---|---|
| 1,970,416 | Chaveas | Aug. 14, 1934 |
| 1,995,096 | Fritz | Mar. 19, 1935 |
| 2,436,982 | Turnquist | Mar. 2, 1948 |